United States Patent [19]
Streett

[11] Patent Number: 4,617,712
[45] Date of Patent: Oct. 21, 1986

[54] METHOD FOR REPLACING CORVETTE DOOR HINGE SPRING

[75] Inventor: James T. Streett, Pottstown, Pa.

[73] Assignee: Street Specialty Products Inc, Pottstown, Pa.

[21] Appl. No.: 490,433

[22] Filed: May 2, 1983

[51] Int. Cl.[4] .............................. B23P 7/00; B23P 7/04
[52] U.S. Cl. .................................... 29/402.08; 16/308; 16/354; 29/434
[58] Field of Search .................. 16/308, 354, DIG. 36; 29/402.08, 434; 267/58; 296/146

[56] References Cited

U.S. PATENT DOCUMENTS

| | | | |
|---|---|---|---|
| 3,370,317 | 2/1968 | Marchione | 16/308 |
| 4,285,098 | 8/1981 | Hicks et al. | 16/308 |

*Primary Examiner*—Howard N. Goldberg
*Assistant Examiner*—Timothy V. Eley
*Attorney, Agent, or Firm*—Frederick J. Olsson

[57] ABSTRACT

A method of replacing a broken S-shaped door hinge spring of a Corvette motor car by removing the broken spring, placing a new S-shaped spring in the keeper hole and keeper slots of the hinge plate on the body, and then twisting the spring with a hand tool and tapping upwardly on the spring with a hammer to place the tip of the lower part of the spring in the rear keeper slot of the hinge plate.

4 Claims, 8 Drawing Figures

METHOD FOR REPLACING CORVETTE DOOR HINGE SPRING

DISCLOSURE

This invention relates to spring-loaded hinges for passenger vehicle doors and more specifically relates to the springs in Corvette door hinges which are prone to fracture with repeated use.

In one aspect, the invention contemplates a method which permits the repairing of such defective hinges by replacing only the spring of the hinge rather than making the repair by purchasing a whole new spring and paying large labor costs for removal of the original hinge and installation of the new one as was the case prior to my invention.

Prior to my invention, the conventional way of repairing a door with a fractured spring required an outlay in the order of $160 per driver's side door and $140 per passenger's side door of which around $30 represented the cost of a hinge and the remainder the cost of installation labor.

With my invention, either the driver's side door or the passenger's side door can be repaired by the vehicle owner at a cost of approximately $20 per door or if the owner hires a mechanic, for a cost of approximately $40 per door.

In another aspect, the invention contemplates a replacement spring of the kind in question which is structured so that it eliminates the cause for the breakage of the original springs.

With my invention, the replacement spring will not fracture or break as the original.

In another aspect, the invention contemplates a replacement spring of the kind in question structured with a single keeper notch adapting the spring for use on either the left or right hand door.

The invention will be described in connection with the drawings noted below. In these drawings the orientation of the hinge as respects the front, rear, outside, and inside of the car are noted where appropriate for better understanding.

Heretofore, I have used the term "spring" with reference to the Corvette hinge. As the description proceeds, it will be understood that the spring functions as a yieldable cam follower on the door of the Corvette which cooperates with a detent cam (a pair of rollers) on the door to create or establish a plurality of detents which control the opening and closing of the door.

Also, it is pointed out that I have used the terms "slot" and "hole" with respect to the hinge plate on the car body since the plate is manufactured with such structure. As the description proceeds, it will be understood that the walls of a "hole" or a "slot" can serve the same functional purpose as regards mounting and/or controlling the spring on the plate.

The method of the invention is described primarily in connection with my improved spring. During the description I will comment as to how the method is used when the replacement spring is the same as the original equipment spring.

Figure 1:
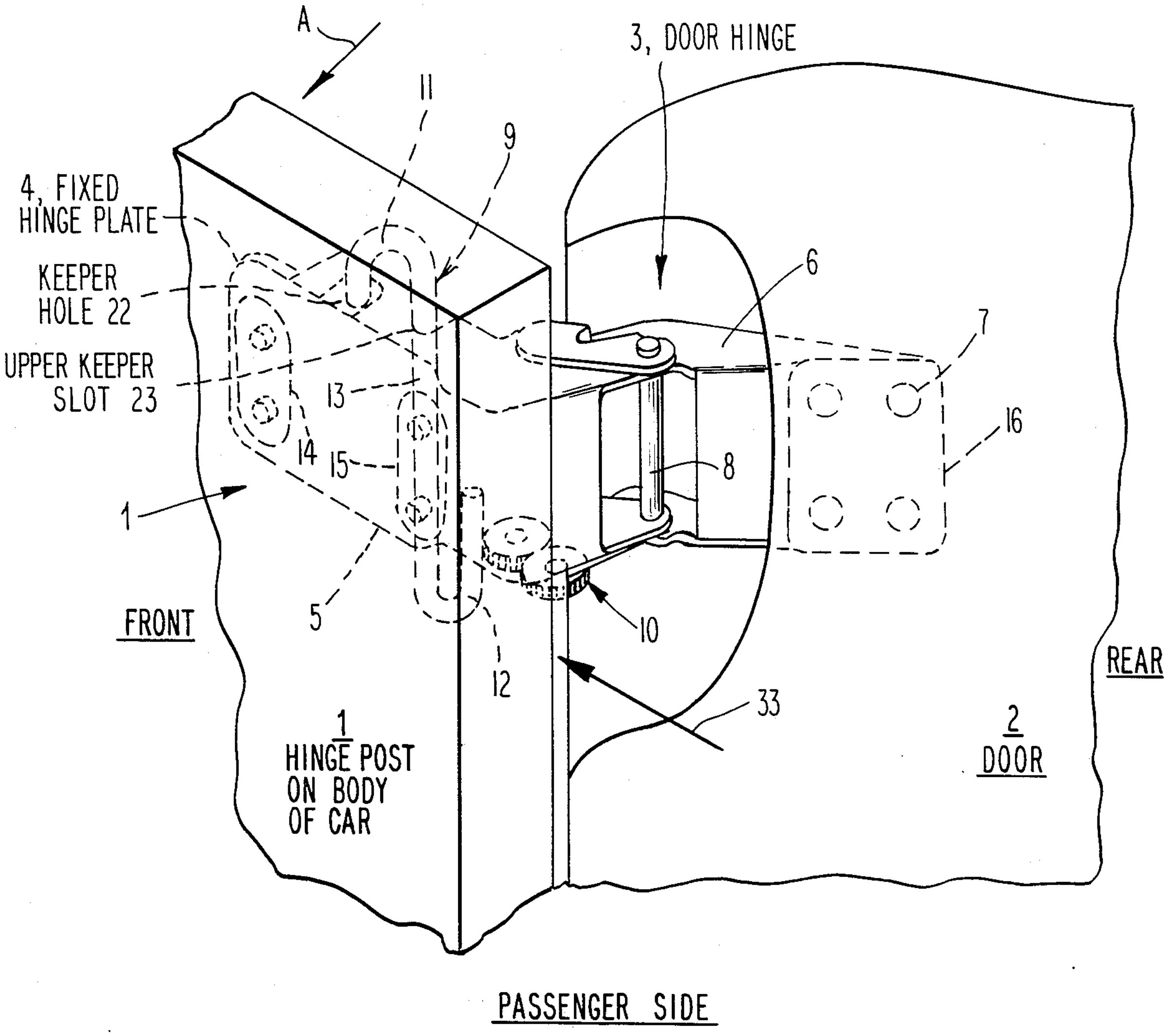
FIG. 1 is a perspective, fragmentary view of the top section of a Corvette showing the hinge and spring, the view being taken inside of the vehicle on the passenger's side.

In FIG. 1 the hinge post of the body of a Corvette car is represented at 1, the passenger side door at 2, and the upper hinge mounting the door on the body at 3.

The hinge has a fixed plate 4 mounted to the body as by screws 5, a movable hinge plate 6 mounted on the door as by screws 7, a pivot pin 8 connecting the plates, a cam follower spring 9 mounted on the fixed plate 4, and detent roller cam means 10 mounted on the movable plate 6. The spring and cam engage to create or establish a plurality of detents which control the opening and closing of the door particularly in establishing open positions for the door.

The spring 9 is a round wire form made of spring steel of constant diameter arranged in generally planar, S-shaped form including an upper bent section 11, lower bent section 12, and a straight, elongated mid-section or body 13.

The upper bent section has an inside portion **11*a* connected to the body 13 and an outside portion 11*b* spaced from the inside portion 11*a*. The lower bent section 12 has an inside portion 12*a* connected to the body 13 and an outside portion 12*b* spaced from the inside portion 12*a*.**

The S-shaped configuration described above is the configuration of original equipment spring. My improved spring has modifications in the upper bent section 11 and in the lower bent section 12. These modifications as compared to the original equipment springs will be noted later.

The original equipment springs and my improved spring function for detent purposes by that the upper bent section 11 is held fixed and the lower bent section 12 is held so that it can be moved by the roller cam to thereby set up counter-torsion forces in the mid-section to oppose cam motion and thereby establish the desired detents as function of the open positions of the door.

The hinge post has access opening means indicated by the dotted lines 14 and 15 whereby the heads of screws 5 are available from the inside of the car for removal of plate 4. The inside of the door 2 also has an access opening indicated by the dotted lines 16 for removing the plate 6. On the passenger side the access holes 14, 15, and 16 are available by the removal of covering panels.

On the driver's side, the hinge plate on the door is removable similarly as the plate 6. However, the plate on the hinge post is available only after removal of certain dash board panels which results in a substantial increase in removal time as compared to the passenger side.

The original equipment springs on Corvettes are prone to break for reasons discussed later. Defective hinges were heretofore repaired by removal of the original hinge and replacement by a new hinge and spring. In accordance with the method described herein, repairs to defective hinges are accomplished simply by removing the broken spring and replacing the same with another spring. The original hinge remains intact.

In the material which follows, assume that a defective spring on the passenger side has been removed. This is normally accomplished by holding the door open and pulling out the parts with the hands or using pliers.

Figure 2:
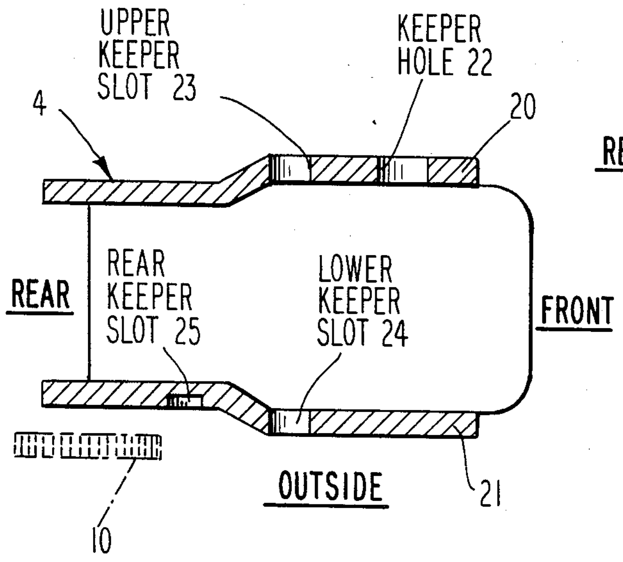
FIG. 2 is a sectional, elevational view,looking in the direction of the arrow A, of the plate of the hinge which is fixed to the body of the car, the plate is sectioned to show the keeper hole and keeper slots.

Referring to FIG. 2, the fixed hinge plate 4 has an upper flange 20 and a lower flange 21. On the forward part of flange 20 is a keeper hole 22 and to the rear of keeper hole 22 is upper keeper slot 23. On the lower flange 21 is a lower keeper slot 24 vertically aligned with the upper keeper slot 23. To the rear of flange 21 is rear keeper slot 25. In the rear keeper slot 25, the outboard end which is engaged by the tip of the spring is off-set inwardly toward the car body with respect to the upper and lower keeper slots 23 and 24 to put a bias or pre-load on the spring. The foregoing holes and slots are manufactured by the car builder and are employed to hold the original equipment spring and my replacement spring, and are not modified for the latter purpose.

Figure 3:
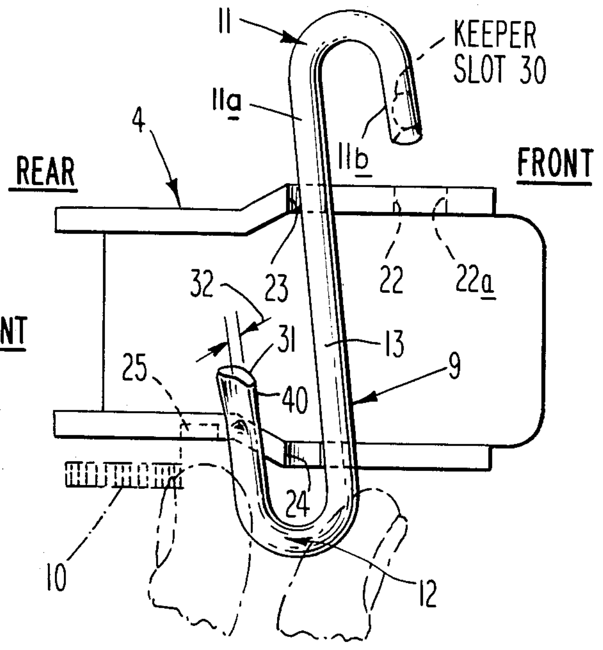
FIG. 3 is an elevational view of the hinge plate of FIG. 2 (not in section) with a upper bent section of a replacement spring about to be inserted in the upper keeper hole and upper keeper slot of the plate.

The improvements in my spring 9 as compared to the original equipment spring will be described in connection with FIG. 3.

The upper bent section 11 has a keeper slot 30 whose locus is normal to the plane of the spring. With this orientation the keeper slot 30 receives the forward wall 22*a* of the keeper hole 22.

Each original spring on a Corvette car had its keeper slot 90° away from slot 30 and this necessitated one spring for the driver's side and another spring with the keeper slot positioned 180° away for the passenger side. While the design could be changed to provide two diametrically opposed keeper slots so that the spring could be used on either side the two-slot spring would be weaker.

By placing the keeper slot 30 forward, my spring has the advantage of being useable on either side without sacrificing strength.

The tip 31 of the lower bent section 12 (as will be noted in datail later) fits into the rear keeper slot 25. This tip moves back and forth in the slot as the lower bent section engages the cam means 10. The tip has a thickness dimension in a direction the same as the plane of the spring (indicated by arrows 32) which is less than the diameter of the wire form. With the reduced thickness the tip clears the side of the rear keeper slot 25 and avoids binding. The original springs on a Corvette car did not have a reduced thickness tip, the tip having the same diameter as the remainder of the spring. This has never been changed.

The reduced thickness as shown is provide by upsetting the end of the bent section and the tip flares outwardly so that thickness dimensions at right angles to the dimension 32 is greater than the diameter of the wire form. This has some advantages in causing the spring to develop more counter torsion forces resisting the torsion force due to cam engagement and give somewhat more position control in opening, closing, and detenting.

It will be understood that the dimension 32 can be provided simply by machining the end of the wire form. With such machining the dimension normal to dimension 32 remains the same as the diameter.

In constructing my improved spring I have used conventional spring steel and have made some dimensional changes which help in installing the spring in position. The vertical distance between the end of the tip 31 and the center line of the upper bent section 11 has been increased ¼". In making the foregoing change the keeper notch slot is set in so that the vertical distance between its lower wall and the end of the tip remains the same as in the original spring. The radius of the upper bent section 11 was increased 1/32". The outside portion 11b of the upper bent section 11 has a slight taper, i.e. its axis is oriented at an acute angle to the axis of the mid-section between 5° and 8°.

Now then, with the above in mind, I will now describe the replacement method and the tool used for same.

With the door in open position and while inside the car, the lower bent section 12 of the spring is grasped in the fingers, so that the upper bent section 11 faces in the forward direction and then is moved between the hinge post and the forward end of the door underneath the hinge (see arrow 3 in FIG. 1) to a point below the forward end of the fixed hinge plate 4 and thence upwardly until the upper bent section 11 is above the fixed hinge plate 4 (see FIG. 3) and then moved laterally toward the fixed hinge plate 4 and manipulated to insert the upper bent section 11 in the keeper hole 22 and in the upper keeper slot 23 and to insert the mid-section or body into the lower keeper slot 24.

The manipulation of the spring to make the above insertions may be speeded up if the mid-section or body 13 is first roughly lined up with the upper keeper slot 23. This will set the stage for quick follow-through with the insertion in the keeper hole 22 and lower keeper slot 24.

Figure 4:
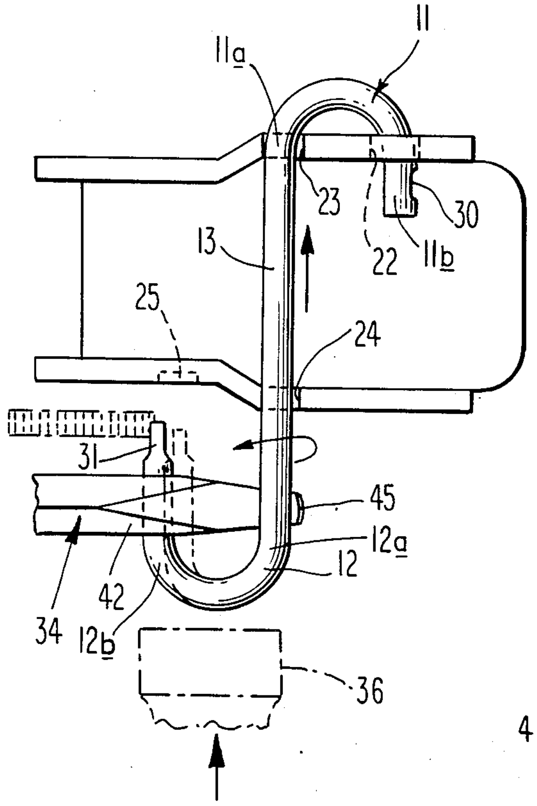
FIG. 4 is a view of the hinge plate of FIG. 3 with the upper bent section of the spring inserted in the upper keeper hole and upper keeper slot and with the lower bent section in the lower keeper slot and being positioned for the end of the lower bent section to be inserted in the rear keeper slot.

At this point the spring will be in the position as seen in FIG. 4 with the tip 31 slightly spaced from the roller cam means 10. The inside portion 11*a* and the outside portion 11*b* are respectively in the upper keeper slot 23 and keeper hole 22. The mid-section or body 13 is in the lower keeper slot 24.

A tool 34 is then inserted inside the lower bent section 12. The tool should engage the bent section about 1" down from the end of tip 31. This is to insure clearance with the cam means 10 and to be far enough away from the bend so that the necessary twisting force is not too great.

Figure 7:
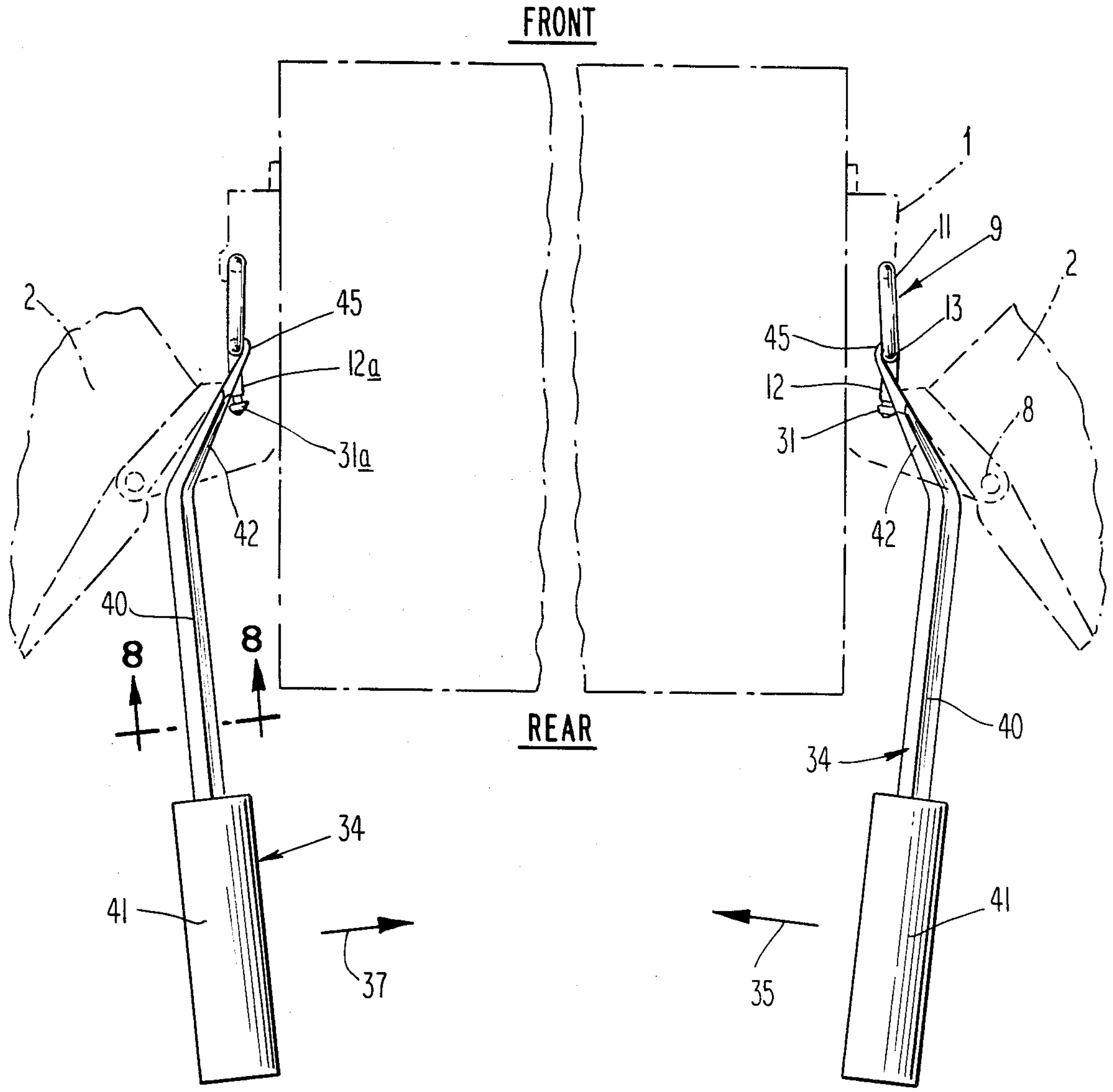
FIG. 7 is a diagramatic view to further illustrate how the tool of the invention is manipulated for installing the spring.

After being positioned as shown, the tool is rotated toward the center of the car(see arrow 35 in FIG. 7). This will cause the lower bent section to yield and the tip 31 moved toward the center of the car. The tool motion is carried out so that the tip 31 is in vertical alignment with the rear keeper slot 24.

For a right handed person the tool is rotated as above described by using the left hand. This leaves the right hand free for the next step.

While holding the tip 31 in vertical alignment with rear keeper slot 25 a hammer 36 is used to tap the lower bent section 12 to cause the spring to move vertically upward. The upward motion brings the tip 31 into the rear keeper slot 25 and causes the forward edge 22*a* of the keeper hole to be received in the keeper slot 30 and for the lower bent section 12 to engage the cam means 10. The yielding of the lower bent section 12 to bring the tip into rear keeper slot 25 causes the same to move away from and assume an angular position with respect to the plane of the spring toward the center of the car as is illustrated in FIG. 7.

After the spring is in position, the tool is removed. The angled condition of the bent section 12 develops a torsion force tending to move the bent section outward to its original planar position. Such motion is restrained by the side 40 on the tip 31 engaging the outboard end of rear keeper slot 25.

Figure 5:
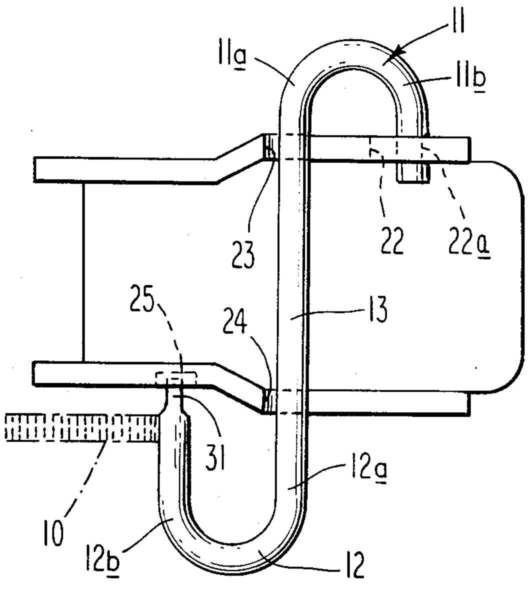
FIG. 5 is an elevational view of the hinge plate of FIG. 3 with the upper and lower bent sections in position.

With reference to FIG. 5, it will be clearly seen that the dimension 32 of the tip 31 substantially clears the forward and rear walls of the slot 25. Thus, when the lower bent section is engaged by the roller cam 10, the tip 31 can move inboard and outboard in the slot 25 without engaging the forward and rear walls.

Original equipment springs do not have the reduced dimension 32 and due to alignment, wear, and tolerance conditions, the tip 31 binds on the forward wall of the rear keeper slot 25. Moreover, the original equipment springs have a snapping action during operation. Thus, the binding sets up undesireable torsion and/or impact forces which after repeated opening and closing of the door fatigue the spring and cause failure.

The same procedure is followed when installing a spring on the driver's side. The inward movement of the tool 34 is indicated by arrow 37. The angled condition of the lower section is indicated at 12*a* and the inner spacing of the tip is indicated at 31*a* in FIG. 7.

The tool 34 of the invention is illustrated in FIG. 7. The tool has an elongated shaft 40, a handle section 41 at one end of the shaft, and an arm 42 at the other end of the shaft.

The arm is oriented at an angle between 105 and 165 degrees with respect to the axis of shaft 40. Preferably the angle is set at approximately 128 degrees.

The angled condition is for the purpose of permitting the tool to be used in the installing of a spring. Generally speaking, the angled condition permits the shaft 40 to extend front to rear and the arm to extend inwardly. This condition is shown in FIG. 7 and pertains to whether the installation is on the driver's or passenger's side.

Figure 8:
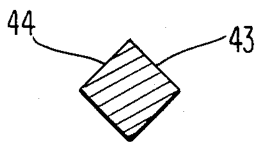
FIG. 8 is a view taken along the lines 8—8 of FIG. 7.

As indicated in FIGS. 4, 7, and 8 , shaft and arm have a rectangular shaped shape cross section. This sets up surfaces 43 and 44 to be slanted. The surface 43 is slanted down and inboard when the tool is used on the driver's side and the surface 44 slants down and inboard when the tool is used on the passenger side. The reason for the slanted surface is so that when the tool is rotated inboard and if it is correctly placed on the lower bent section 12 of the spring, the, engagement of a slanted surface 143 or 441 with the roller cam means 10 support will tend to move the tool down and permit the operation to continue.

As indicated, the tip 45 of the arm has an arcuate contour which fits over the round surface of the spring. This is for use in exerting a rearward pulling force on the spring when the spring being installed is the original equipment type as will be commented on later.

The invention contemplates that the necessary grip for the above mentioned rearward pulling force by achieved by friction surfaces on the arm 42 rather than the contoured tip 45. This surface is provided by knurling or a soft plastic coating.

Figure 6:
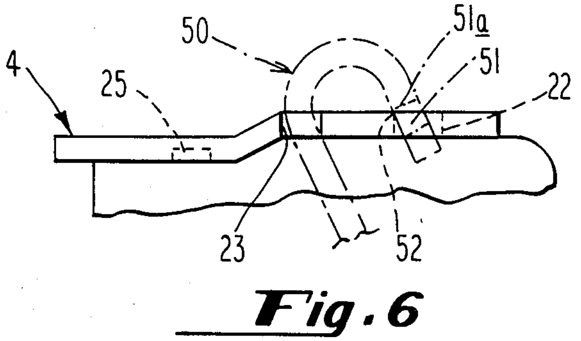
FIG. 6 is a fragmentary view to illustrate a step in the insertion of an original equipment, type spring.

I will now comment on the method as employed ( on the passenger side) to insert original equipment type springs particularly with reference to FIG. 6. In FIG. 6 the original equipment spring 50 has a keeper notch 51.

With respect to inserting the tool 34 inside the lower bent section 12, note with reference to FIGS. 4 and 7 that the arm 42 is dimensioned and angled so as to permit such insertion and so that when the handle, shaft, and arm are rotated toward the center of the car body, one edge of the arm engages the inside portion 12*a* and the opposite edge of the arm engages the outside portion 12*b* to cause twisting of the lower bent section 12 and movement of the outer portion 12*b* inwardly to a position where its tip 31 is in vertical alignment with the rear keeper slot 25.

The spring 50 is held in the same way as above described and the upper bent section is brought up above the fixed hinge plate and inserted into the upper keeper hole 22 and upper keeper slot 23. Then the lower bent section of the spring is moved forward as far as it will go. The affect of this is to tilt the spring as shown.

In this position the mid-section is forward of the lower keeper slot 24. Ideally the upper side 51*a* of the keeper notch 51 will be above the keeper hole as shown.

The tool 34 is then inserted into the lower bent section. Then the tool is manipulated to impose simultaneous forces on and, thus, movements of the lower bent section. The handle is moved toward the center of the car and at the same time the handle is pulled to the rear. The free hand may be used to assist in this operation. Handle motion toward the center and rear of the car moves the tip of the lower bent section for alignment with the rear keeper slot and the mid-section for alignment with the lower keeper slot 24. The resultant of the above is that the spring pivots generally about the point 52 such that the lower bent section swings around until the tip of the lower bent section is in the rear keeper slot 25. At that point the keeper notch 51 will have received the side of the outboard side keeper hole 22.

To check that the spring is properly positioned, the end of the lower bent section can be tapped in an upward direction with a hammer.

In many cases, it happens that the keeper notch 51 is inside of or partially below the keeper hole 22. In such cases, the tapping of the lower bent section is required to properly place the spring in position.

The same procedure as discussed above is followed for installation on the driver's side.

I claim:

1. The method of replacing a broken door hinge spring on a Corvette motor car:

providing a Corvette motor car having a body and a door and a door hinge including a fixed hinge plate mounted on the car body, a moveable hinge plate mounted on the car door with the hinge plates being connected by a pivot pin, a broken hinge spring on the fixed hinge plate, cam means on the moveable hinge plate, the fixed hinge plate having upper and lower flanges with the upper flange having a keeper hole and an upper keeper slot and with the lower flange having a lower keeper slot in vertical alignment with the upper keeper slot and the lower flange also having a rear keeper slot the outboard end of which is off-set inwardly from the upper and lower keeper slots;

removing said broken spring;

providing a cam follower spring having an upper bent section, a lower bent section and a mid-section therebetween together with a keeper slot in the upper bent section;

placing the door in an open position;

with the upper bent section facing the front of the car, manipulating the spring to insert the upper bent section into the keeper hole and into the upper keeper slot and to insert the mid-section into the lower keeper slot;

inserting a tool inside the lower bent section and rotating the tool toward the center of the car to twist the midsection and cause said tip to be vertically aligned with the rear keeper slot;

while holding the tool so that the tip remains in said aligned condition, tapping the lower bent section with a hammer to cause the spring to move vertically until the tip is received within the rear keeper slot and the keeper slot in the upper bent section receives the side of the keeper hole and the lower bent section is positioned to engage the cam means when the tool is released; and releasing and removing said tool.

2. The method of replacing a broken door hinge spring on a Corvette motor car:

providing a Corvette motor car having a body and a door and a door hinge including a fixed hinge plate mounted on the car body, a moveable hinge plate mounted on the car door with the hinge plates being connected by a pivot pin, a broken hinge spring on the fixed hinge plate, cam means on the moveable hinge plate, the fixed hinge plate having upper and lower flanges with the upper flange having a keeper hole and an upper keeper slot and with the lower flange having a lower keeper slot in vertical alignment with the upper keeper slot and the lower flange also having a rear keeper slot the outboard end of which is off-set inwardly from the upper and lower keeper slots;

removing said broken spring;

providing a cam follower spring having an upper bent section, a lower bent section, and a mid-section therebetween together with a keeper slot in the upper bent section;

placing the door in an open position;

with the upper bent section facing the front of the car, holding the spring in the fingers and manipulating the spring to insert the upper bent section into the keeper hole and upper keeper slot and moving the lower bent section toward the front of the car;

inserting a tool inside the lower bent section and simultaneously rotating the lower bent section toward the center of the car and pulling the section toward the rear of the car and inserting the mid-section of the spring in the lower keeper slot and said tip into the rear keeper slot and with the lower bent section positioned to engage the cam means when the tool is released;

releasing and removing said tool.

3. The method of replacing a broken door hinge spring on a Corvette motor car:

providing a Corvette motor car having body and a door and a door hinge including a fixed plate mounted on the car body, a moveable hinge plate mounted on the car door with the hinge plates being connected by a pivot pin, a broken hinge spring on the fixed hinge plate, cam means on the moveable hinge plate, the fixed hinge plate having upper and lower flanges with the upper flange having a keeper hole and an upper keeper slot and with the lower flange having a lower keeper slot in vertical alignment with the upper keeper slot and the lower flange also having a rear keeper slot the outboard end of which is off-set inwardly from the upper and lower keeper slots;

removing said broken spring;

providing a cam follower spring having an upper bent section, a lower bent section, and a mid-section therebetween together with a keeper slot in the upper bent section;

placing the door in an open position;

with the upper bent section facing the front of the car, holding the spring in the fingers and manipulating the spring to insert the upper bent section into the keeper hole and upper keeper slot and moving the lower bent section toward the front of the car;

inserting a tool inside the lower bent section and simultaneously rotating the lower bent section toward the center of the car and pulling the section toward the rear of the car and inserting the mid-section of the spring in the lower keeper slot and aligning said tip with the rear keeper slot;

while holding the tool so that the tip remains in said aligned condition, tapping the lower bent section with a manner to cause the spring to move vertically until the tip is received within the rear keeper slot and the keeper slot in the upper bent section receives the side of the keeper hole and the lower bent section is positioned to engage the cam means when the tool is released; and releasing and removing said tool.

4. The method of replacing a broken door hinge spring on a Corvette motor car:

providing a Corvette motor car having a body and a door and a door hinge including a fixed hinge plate mounted on the car body, a moveable hinge plate mounted on the car door with the hinge plates being connected by a pivot pin, a broken hinge spring on the fixed plate, cam means mounted on the moveable hinge plate, the fixed hinge plate having upper and lower flanges with the upper flange having a keeper hole and an upper keeper slot and with the lower flange having a lower keeper slot in vertical alignment with the upper keeper slot and the lower flange also having a rear keeper slot the outboard end of which is off-set inwardly from the upper and lower keeper slot providing a cam follower spring which is a wire-form made of round spring steel of constant diameter arranged in generally planar, S-shaped form and including:

(a) a straight, elongated body section;

(b) an upper bent section on one end of the body section;

(c) a lower bent section on the other end of the body section;

(d) on said upper bent section, a keeper slot whose locus is normal to the plane of the wire-form for use in receiving the forward edge of said keeper hole; and (e) said tip of the lower bent section being formed with a thickness dimension in a direction the same as said plane which is less than the diameter of the second bent section, said thickness dimension being smaller so as to clear the walls of said rear keeper slot as the tip is moved with the lower bent section when same is being engaged by said cam means;

placing the door in an open position;

with the upper bent section facing the front of the car, manipulating the spring to insert the upper bent section into the keeper hole and into the upper keeper slot and to insert the mid-section into the lower keeper slot;

inserting a tool inside the lower bent section and rotating the tool toward the center of the car to twist said body section and to cause said tip to be vertically aligned with the rear keeper slot;

while holding the tool so that the tip remains in said aligned condition, tapping the lower bent section with a hammer to cause the spring to move vertically until the tip is received within the rear keeper slot and the keeper slot in the upper bent section receives the side of the keeper hole and the lower bent section is positioned to engage the cam means when the tool is released; and releasing and removing said tool.

* * * * *